(12) United States Patent
Thomas et al.

(10) Patent No.: US 8,095,415 B1
(45) Date of Patent: Jan. 10, 2012

(54) HUMAN CAPITAL DEVELOPMENT FRAMEWORK

(75) Inventors: Robert J. Thomas, Brookline, MA (US); Susan Marie Cantrell, South Boston, MA (US); James M. Benton, Great Neck, NY (US); John W. Alden, Annapolis, MD (US); Anthony G. Alati, Northville, MI (US); Rene L. Kemp, Grand Haven, MI (US)

(73) Assignee: Accenture Global Services GmbH, Schaffhausen (CH)

( * ) Notice: Subject to any disclaimer, the term of this patent is extended or adjusted under 35 U.S.C. 154(b) by 1923 days.

(21) Appl. No.: 10/430,674

(22) Filed: May 7, 2003

(51) Int. Cl.
*G06Q 40/00* (2006.01)
(52) U.S. Cl. ..................................... 705/7.39
(58) Field of Classification Search .................. 705/7.39
See application file for complete search history.

(56) References Cited

U.S. PATENT DOCUMENTS

| | | | | |
|---|---|---|---|---|
| 6,161,101 | A * | 12/2000 | Guinta et al. | 706/45 |
| 6,556,974 | B1 * | 4/2003 | D'Alessandro | 705/10 |
| 6,877,034 | B1 * | 4/2005 | Machin et al. | 709/223 |
| 2003/0018519 | A1 * | 1/2003 | Balz et al. | 705/11 |
| 2003/0050814 | A1 * | 3/2003 | Stoneking et al. | 705/7 |
| 2003/0078804 | A1 * | 4/2003 | Morrel-Samuels | 705/1 |
| 2003/0172013 | A1 * | 9/2003 | Block et al. | 705/33 |

OTHER PUBLICATIONS

Curtis, Bill; Hefley, William E.; Miller, Sally; "People Capability Maturity ModelSM", Sep. 1995, Software Engineering Institute,CMU/SEI-95-MM-02.*
Kaplan, Robert S. et al., Linking the Balanced Scorecard to Strategy, California Management Review, vol. 39, No. 1, Fall 1996, pp. 53-79.*
Huselid et al., Technical and Strategic Human Resource Management Effectiveness as Determinants of Firm Performance, Academy of Management Journal, vol. 40, No. 1, 1997.*
Kellen et al., ,Business Performance Measurement, At the Crossroads of Strategy, Decision-Making, Learning and Information Visualization, Feb. 2003.*
Johanson et al., Human Human Resource Costing and Accounting Versus the Balanced Scorecard: A Literature Survey of Experience With the Concepts, School of Business Stockholm University, 1999.*
Liang et al., Dashboards and Scorecards: Executive Information Systems for the Public Sector, Government Finance Review, Dec. 2001.*
Bontis et al., The Knowledge Toolbox: A Review of the Tools Available to Measure and Manage Intangible Resources, European Management Journal vol. 17, No. 4, pp. 391-402, 1999.*

* cited by examiner

*Primary Examiner* — Beth V Boswell
*Assistant Examiner* — Nadja Chong Cruz
(74) *Attorney, Agent, or Firm* — Finnegan, Henderson, Farabow, Garrett & Dunner, LLC (57) ABSTRACT

The invention provides a human capital development framework which allows organizations to assess the business impact of human capital initiatives and guide their implementation. The invention further provides a four-tier tool for arriving at an assessment of an organization's human capital practices. The first tier includes a measurement of business results, the second tier involves key performance drivers which contribute to business results, the third tier involves human capital capabilities and the fourth tier involves human capital processes. Surveys are provided to collect data for each tier and a detailed report is generated based upon survey results.

18 Claims, 5 Drawing Sheets

HUMAN CAPITAL DEVELOPMENT FRAMEWORK

BACKGROUND OF THE INVENTION

1. Field of the Invention

The invention relates to the human capital development framework, and more particularly to the framework's methods and systems for quantifying the maturity of human capital processes and the impact of human capital practices on visible company metrics.

2. Discussion of the Related Art

In many business organizations, human (employee) performance often has a significant impact on the organization's financial condition and even stock valuation. Financial analysts frequently treat human performance as an expense, rather than an asset, and thus investments in human performance are not properly valued. Some organizations utilize Human Resources (HR) scorecards to evaluate performance of an HR department. However, these scorecards are not helpful in determining whether companies are getting the optimal return on their investments in people. Benchmark databases are also utilized to provide insight on how much companies are spending on training, salaries, etc., but they do not offer much insight on where strategic investments can be made.

There is a desire for an improved methodology for measuring the impact of human capital investments and interventions on business results. Most executives intuitively know that people are key to achieving and sustaining performance improvements in almost any business area, yet they are unable to support their beliefs with empirical evidence. A significant impediment of effective intervention into the domain of human performance has been the lack of convincing evidence that human capital investments improve a company's financial performance. In many cases, organizations are investing in human capital without the ability to gauge the level of return on those investments. In particular, managers lack the tools and metrics to help them make intelligent investments in human capital and other value-creating intangible assets. Thus, it would be desirable to have a framework which allows organizations to quantify the relationship between human capital practices and the organization's bottom line.

Until now, no single study or approach has sufficiently explained the relationship between the two by linking a comprehensive set of human capital processes, the people-related outcomes or human capital capabilities related to these processes (e.g., employee engagement), intermediate key performance drivers and business results.

SUMMARY OF THE INVENTION

The invention provides a human capital development framework which allows an entire enterprise or subset or a subgroup of an enterprise (e.g., business unit) to assess the business impact of human capital initiatives and guide their implementation. The invention's development was guided by several objectives: to identify and measure the human capital factors that affect organizational performance, whether they do so directly or indirectly, immediately or with a lag; develop a measurement scheme that is repeatable, i.e., that can be carried out over successive time periods in a single organization and, therefore, allow that organization to track its performance over time; and establish a database that enables companies to benchmark themselves against competitors in key human capital development areas and also predict the return on investment from specific human capital investments and interventions.

The invention's structure is guided by five principles for how an organization's human capital assets and capabilities affect its financial performance: employees who value their work and work setting make the kind of effort and contributions that enable an organization to create the highest level of shareholder return; an organization's investments in human capital development processes, like learning and training, must be thoughtfully deployed to have a positive effect on employees' sense of engagement; an organization whose human resources and human capital development practices are both valued by employees and aligned with business strategy will achieve superior results in key business performance drivers such as productivity, innovation and customer satisfaction; organizations invest in human capital development to enhance their capabilities in key areas, for example, their ability to change in response to shifts in critical markets, or to rapidly reconfigure work units and business processes to take full advantage of new technologies; and organizations that achieve superior performance in productivity and customer satisfaction will be rewarded in the marketplace by investors and analysts.

Based on these principles, the human capital development framework provides a four-tier tool for arriving at an assessment of how an organization's human capital practices impact business results. The first tier in accordance with an embodiment of the invention includes a measurement of business results (e.g., traditional financial analyses featuring EVA™, revenue growth, market share and stock performance). The second tier in accordance with an embodiment of the invention involves key performance drivers which directly contribute to business unit or enterprise results. Key performance drivers are the non-financial intermediate organizational outcomes (e.g., productivity, quality, innovativeness and customer satisfaction, retention and acquisition) often captured in a balanced scorecard. The third tier in accordance with an embodiment of the invention involves human capital capabilities, which includes the most visible and people-related qualities (including employee attitudes and abilities) that are necessary for achieving superior performance in the organization's key performance drivers. Their performance is influenced by the fourth tier in accordance with an embodiment of the invention, which involves human capital processes. Included in this tier are core HR processes (e.g., competency management and performance appraisal) and broader human capital processes such as learning and knowledge management. Within this fourth tier, the focus is on the maturity of an organization's approach to human capital processes. Each of the tiers may be statistically linked using statistical analyses such as linear and non-linear regression analysis, factor analysis and simultaneous equations with time series data.

The human capital development framework in accordance with the invention may be implemented in an organization in a variety of ways, including: as a diagnostic assessment that highlights areas for performance improvement or value creation; as a part of a recurring measurement activity, e.g., one aligned with an organization's core planning processes; or as part of a large-scale organizational transformation, where the goal is to re-shape traditional HR functions to bring them in line with new business strategies.

The invention provides for the use of surveys directed to employees, HR personnel and business leaders. The purpose of the surveys is to collect data for all four tiers described above. The surveys in accordance with the invention may be provided through any number of mechanisms and may for example be web-based, accessible via a local area network (LAN) or virtual private network (VPN) or paper-based forms. In addition, data will be collected from public sources and interviews with the organization's executives.

At each tier, the data from the above sources will be compiled and scored. The score may be created by an algorithm that indicates how strong or weak an element is. At tier 4, the algorithm may determine the process maturity of each human capital process. The algorithm may combine and weight data from different survey questions and data sources to determine the score. The scores from an individual organization will then be combined with scores from other organizations and used in statistical analyses to determine the impact of human capital initiatives on business performance. A report will then be issued to the organization that explains the findings.

The surveys or scorecards in accordance with the invention allow for: addressing top management's strategic organizational questions related to human capital; assessing the maturity of human capital processes and their impact on business results through intermediating drivers of performance; forward-looking, diagnostic measures that enable organizations to identify steps required to improve their human capital capability; and distinguishing the root causes of performance variations both within and across business units.

Therefore, the invention provides a human capital development framework which includes: a four-tier model that links human capital processes to human capital capabilities to key performance drivers to business results; an assessment of both human capital process maturity and the strengths and weaknesses of human capital capabilities, key performance drivers and business results; and the ability to capture data from multiple individuals throughout different levels of an organization through surveys directed to employees, HR directors, and business leaders.

Understanding the value of human capital processes allows organizations to validate human capital initiatives and investments, redirect human capital initiatives and investments for greater business impact, make more effective business consolidation decisions, improve the profit/loss performance of flagging divisions and implement new business strategies grounded in quantifiable data. In addition, once data has been collected from a large number of organizations, the human capital development framework may demonstrate that highly mature human capital processes tend to result in greater benefit and that certain human capital initiatives tend to have more business impact than others.

The human capital development framework is different from conventional frameworks in that it uniquely combines concepts from many existing frameworks to offer the most comprehensive and in-depth approach to assessing the impact of human capital on business results to date. The human capital development framework is different from previous frameworks and approaches in the following ways:

Breadth of coverage: The human capital development framework's coverage of human capital (both the processes and the people-related outcomes) is broader than other frameworks. First, unlike some other popular frameworks, the human capital development framework in accordance with the invention focuses not just on HR, but on broader human capital initiatives such as learning and knowledge management. Also, the human capital development framework covers not only human capital initiatives related to improving cost efficiency (as most other frameworks do), but those related to improving growth opportunities as well. Second, unlike many other frameworks that tie human capital directly to financial results, the human capital development framework in accordance with the invention has a four-tier model, whereby the impact of human capital processes on financial results is intermediated by human capital outcomes and non-financial business results.

Depth of coverage: Unlike most other frameworks, the human capital development framework in accordance with the invention assesses the maturity of human capital processes. Whereas most other approaches evaluate levels of spending (e.g., training budget per employee) or types of HR programs and initiatives in place (e.g., whether or not employees have input into hiring decisions), the human capital development framework in accordance with the invention probes an organization more deeply by assessing such things as the completeness of the underlying human capital processes, the leadership commitment to the processes, and how well supported the processes are by technology and the skills and abilities of the people using the processes. This approach is inspired by advances in the world of quality in both manufacturing and software development—where, for example, total quality techniques, capability maturing models and the like have enabled firms to achieve dramatic improvements in reliability and repeatability of key processes. Because of its focus on processes, the human capital development framework in accordance with the invention can distinguish root causes of performance variations both within and across business units. Many other type of scorecards are unable to suggest root cause related to human capital, nor suggest what to do to improve the capability of human capital.

Reliability of data: The human capital development framework in accordance with the invention captures measures from multiple individuals throughout different levels in the organization (not just executives, but also other members of the organization), resulting in more reliable measures. This also enables the identification of measures for which significant differences in responses exist (e.g., manager vs. non-manager, gender, etc.). Whereas a few other frameworks capture data from multiple types of individuals, most do not.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the invention, examples of which are illustrated in the drawings.

Figure 1:
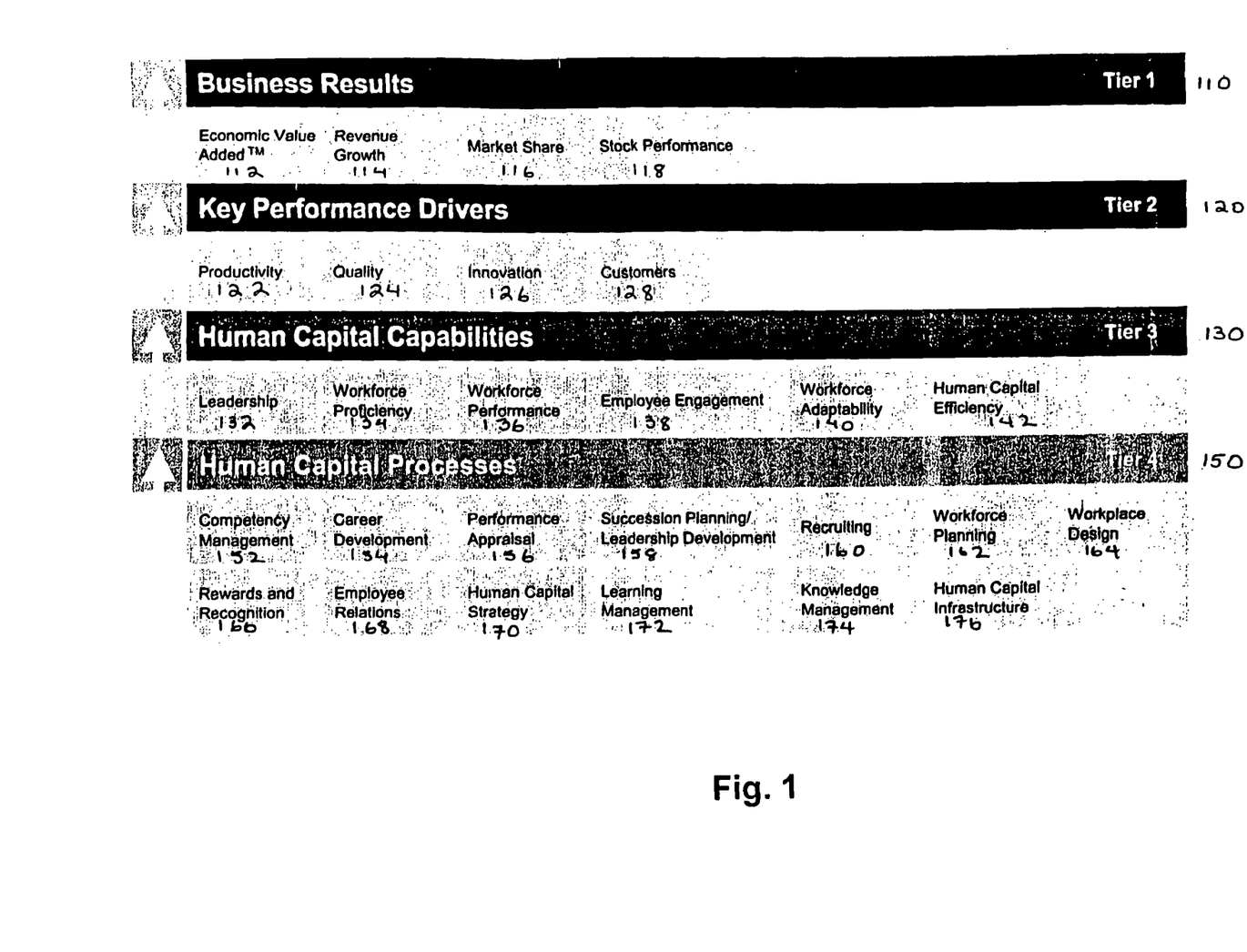
FIG. 1 illustrates the four tier diagnostic tool in accordance with an embodiment of the invention.

FIG. 1 illustrates the four-tier diagnostic tool in accordance with an embodiment of the invention. For each of the tiers, information may be gathered from surveys, employee interviews, or public sources. FIG. 1 shows tier one 110 which includes business results, tier two 120 which includes key performance drivers, tier three 130 which includes human capital capabilities and tier four 150 which includes human capital processes. As will be describe in greater detail below, data from tier four 150 is collected to determine the maturity of each human capital process. Each of the four tiers will be described in turn along with the relationship between each of the tiers.

As shown in FIG. 1, tier four 150 may be divided into thirteen different elements, each of which relates to some aspect of human capital process evaluation. For example, the competency management element 152 relates to the process for defining individual level performance standards, the career development element 154 relates to the process for providing employees with information, advice and guidance to assist them in planning their careers, and the performance appraisal element 156 relates to the process by which an employee's job performance is evaluated in order to provide specific feedback that will reinforce superior performance as well as correct performance problems. The succession planning/leadership element 158 relates to process of identifying, tracking and developing the organization's future leaders, and the recruiting element 160 relates to the process of identifying, selecting and hiring appropriate people to fill available jobs in the organization, and the workplace planning element 162 relates to the process of projecting the organization's workforce needs and taking corrective actions such as staffing increases or decreases and redeployment. The workplace design element 164 relates to the process of optimizing the use of physical space, architecture, interior design, artifacts, and mobile and collaborative technologies to support safe and effective work, and the rewards and recognition element 166 relates to the process of awarding monetary or non-monetary incentives to employees. The employee relations element 168 relates to the process of improving the fit between the needs of the organization and the needs of employees, and the human capital strategy element 170 relates to the design and implementation of a set of internally consistent policies and practices and the allocation of resources to ensure that an organization's human capital contributes to the achievement of business objectives. The learning management element 172 relates to the process by which an organization plans, delivers and manages the learning needed to increase the skills and capabilities of the workforce, and the knowledge management element 174 relates to the process by which an organization identifies, creates, and delivers knowledge content to enhance workforce performance. Finally, the human capital infrastructure process 176 relates to the process by which organizations accomplish administrative tasks such as payroll, vendor management, benefits administration, and time and attendance.

Each of the elements which make up tier four 150 relate to human capital processes and human resources considerations. The invention includes a survey which queries employees and HR directors within each of the elements 152-176. The questions included are uniquely developed to gauge specific aspects of each process, including (but not limited to): the range of best practice activities supported by the process, the technology supporting the process, the skills and abilities necessary for people to effectively carry out the process, the organizational commitment to the process, the evaluation and continuous improvement of the process, and the process' effectiveness in supporting employees.

The invention further provides that the survey responses for each of the elements 152-176 are scored. A score is generated by an algorithm that indicates how mature each process is. The algorithm may combine and weight data from different survey questions to determine the score. The process maturity score indicates how well an organization performs a process. The scores obtained in the tier four 150 are then used to drive tier three elements. This is accomplished by statistically linking the scores for the elements of tier four 150 to the elements of tier three 130 using statistical analyses such as linear and non-linear regression analysis. Thus, the results of the tier four 150 analysis, which are based upon the survey responses with respect to each of the elements 152-176, make up a unique data structure that is stored for processing in connection with the other tiers: tier three 130, tier two 120, and tier one 110.

As shown in FIG. 1, tier three 130 refers to human capital capabilities and generally corresponds to evaluations made by employees, business leaders and human resources personnel. Tier three 130 includes the following elements: a leadership element 132, a workforce proficiency element 134, a workforce performance element 136, an employee engagement element 138, a workforce adaptability element 140, and a human capital efficiency element 142. The leadership element 132 relates to the leadership abilities in the organization, the workforce proficiency element 134 relates to the skills and abilities of employees, the workforce performance element 136 relates to the job performance of employees, the employee engagement element 138 relates to the satisfaction, retention, and engagement in work by employees, the workforce adaptability element 140 relates to the workforce's flexibility and adaptability to change, and the human capital efficiency element 142 relates to how quickly and cost-effectively human capital management processes are carried out. As with tier 4 150, tier 3 130 includes surveys which include a series of questions relevant to each of the elements shown. Tier 3 data may also be drawn from public sources and from interviews with HR representatives. The survey answers and related data are compiled to determine a scored that assesses the strength or weakness of each element. The scores at tier 3 then drive the elements in the next tier, tier two 120.

Tier two 120 relates to key performance drivers including the following elements: a productivity element 122, a quality element 124, an innovation element 126 and a customers element 128. The productivity element 122 relates to the overall productivity level, the quality element 122 relates to the overall quality of work product or service, the innovation element 126 relates to the overall level of innovation and the customers element 128 relates to the overall satisfaction, acquisition and retention of customers. As with tier four 150 and tier three 130, tier two 120 also includes surveys associated with each of the elements shown. In addition, data relevant to tier two 120 may be collected from public sources and from interviews with business unit leaders and controllers. Data collected for tier two 120 is then used to determine a score that reflects the strength or weakness of each tier two 120 element. These results then drive tier one 100.

Tier one 110 relates to business results and includes (but is not limited to) the following elements: an Economic Value Added™ element 112, a revenue growth element 114, a market share element 116 and a stock performance element 118. The Economic Value Added element 112 relates to the superiority of the return a company is able to realize on invested capital above the baseline return expected by the investment community, the revenue growth element 114 relates to the growth in revenues, the market share element 116 relates to the percentage of the total sales of the organization's type of product or service that are attributable to the organization, and the stock performance element 118 relates to the performance of the stock price over a given period of time. As with tier two 120, tier three 130 and tier four 150, tier one 110 also includes a survey used to collect data on the tier one elements. Data is also collected for tier one 110 elements from brief interviews with business leaders or financial executives, as well as from public sources. The data is then used to determine a score for each element that represents the element's strength or weakness.

The types of survey questions used to collect data at tiers one, two, three and four may include, but are not limited to, questions that elicit specific values or numbers (e.g., revenues, percent of customers that defected with a time period, number of HR positions, number of training hours per employee for a time period); multiple choice questions intended to elicit descriptive factual information (e.g., how often the organization measures a given area or the range of programs or technologies the organization has in a given area); multiple choice questions intended to elicit the participant's perception (e.g., the degree to which management acts on the results of data obtained from measures; or the degree to which the participant has the skills necessary to achieve above average performance in his or her job). Types of statistical analyses used on the data may include, but are not limited to, linear and non-linear regression analysis to identify the strength of relationships between multiple items and groups of items; factor analysis to identify primary factors contributing to the overall variance in responses and scores; and simultaneous equations (path analysis) with time series data.

A scorecard is then generated based upon the scores for elements in tiers one through four. The scorecard presents an assessment of each element's strength or weakness (or, in the case of tier four elements, each element's level of process maturity). In addition, through statistical analysis performed on the elements, the scorecard can be used to present organizations' ability to use human capital to generate business results. The scorecard uses numeric and graphic terms suitable for benchmarking to provide a fact-based foundation for making recommendations for the development and management of people that will result in improved business results. Because the assessment is built around a predictive capability model, recommendations to improve in a specific factor area are fairly clear. The organization will receive a report detailing their organizational strengths in various elements, areas for improvement, and an assessment of process maturity in human capital capabilities. Scorecard results can be compared with results of previous scorecards for the same company, for another business unit in the same company or for other companies in the human capital development-benchmarking database.

Figure 2:
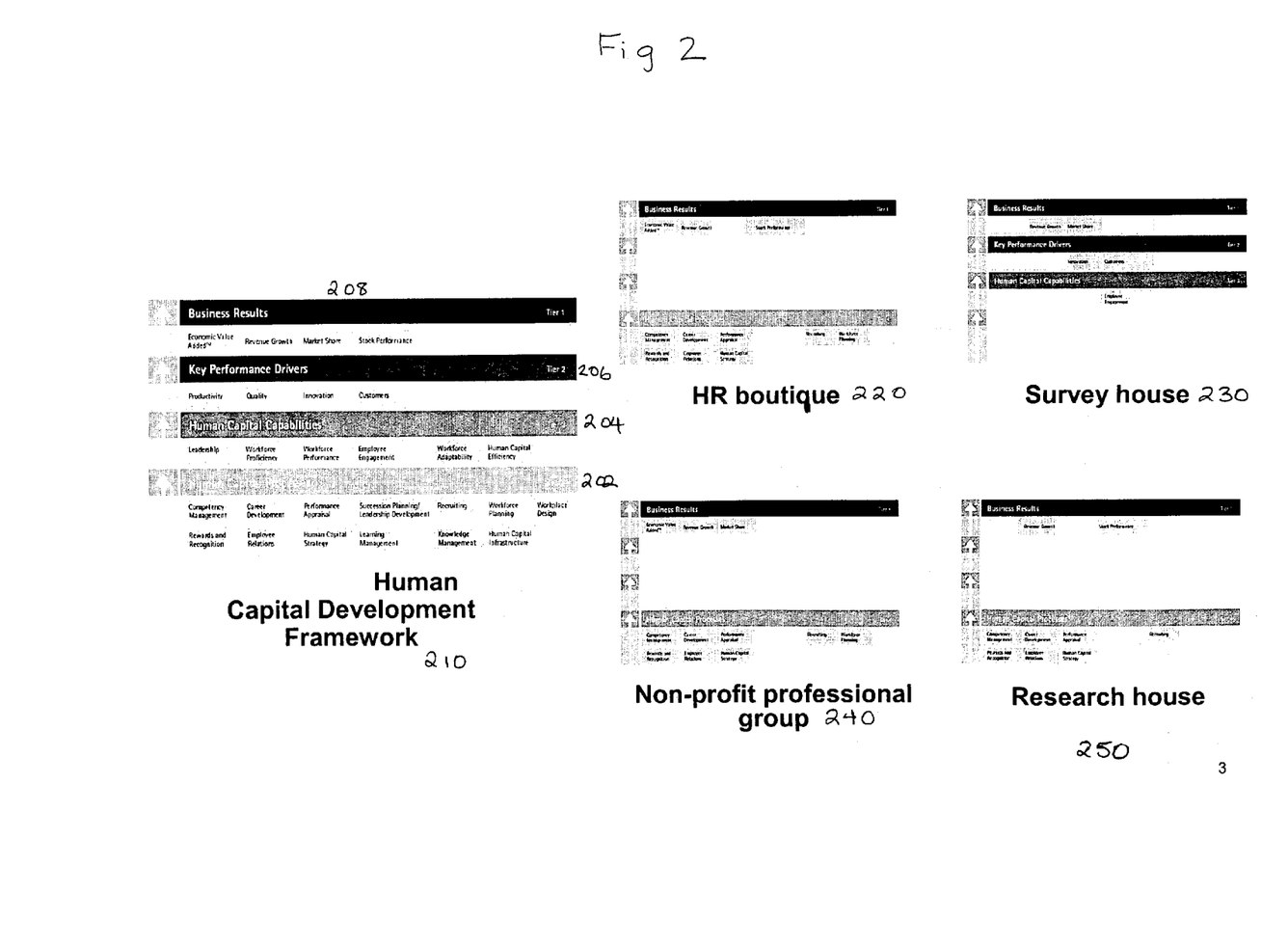
FIG. 2 illustrates how the coverage of the four tier diagnostic tool is broader than the coverage of other diagnostic tools.

FIG. 2 illustrates how the human capital development framework 210 in accordance with the invention compares to several other well-known frameworks 220-250 in terms of coverage of elements in each tier. One framework produced by an HR boutique consulting firm 220 directly links only some elements of tier four 202, human capital processes, to tier one, 208 business results. This framework includes no elements at tier three 204, human capital capabilities, or at tier two 206, key performance drivers. The framework produced by a survey house 230 does not include any elements at tier four 202, human capital processes. It includes only one element at tier three 204, human capital capabilities, and two elements each at tier two 206, key performance drivers, and tier one 208, business results. The framework produced by a non-profit professional group 240 includes some elements of tier four 202, human capital processes, and most elements at tier one 208, business results. However, it does not include any elements at tier three 204, human capital capabilities or tier two 206, key performance drivers. The same is true for the framework developed by a large research house 250.

Figure 3:
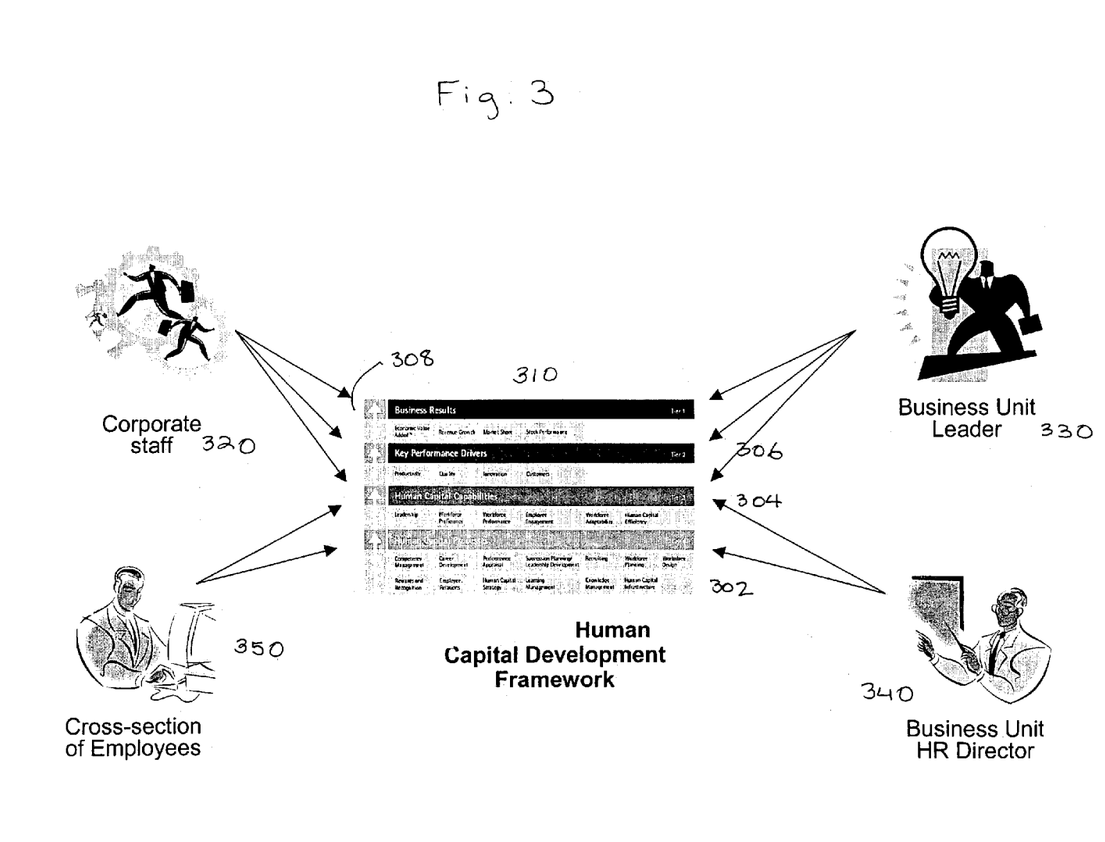
FIG. 3 shows how the survey in accordance with an embodiment of the invention relates to the four tier diagnostic tool.

FIG. 3 illustrates how the survey relates to a four tier model 310 when the business unit (rather than the entire enterprise) is the unit of analysis. Survey questions asked to corporate staff 320 and the business unit leader 330 are used to calculate the scores of elements at tier one 308 (business results), tier two 306 (key performance drivers), and tier three 304 (human capital capabilities). Survey questions asked to the business unit HR director 340 and employees 350 are used to calculate the scores of elements at tier 3 304 (human capital capabilities) and tier four 302 (human capital processes).

Figure 4:
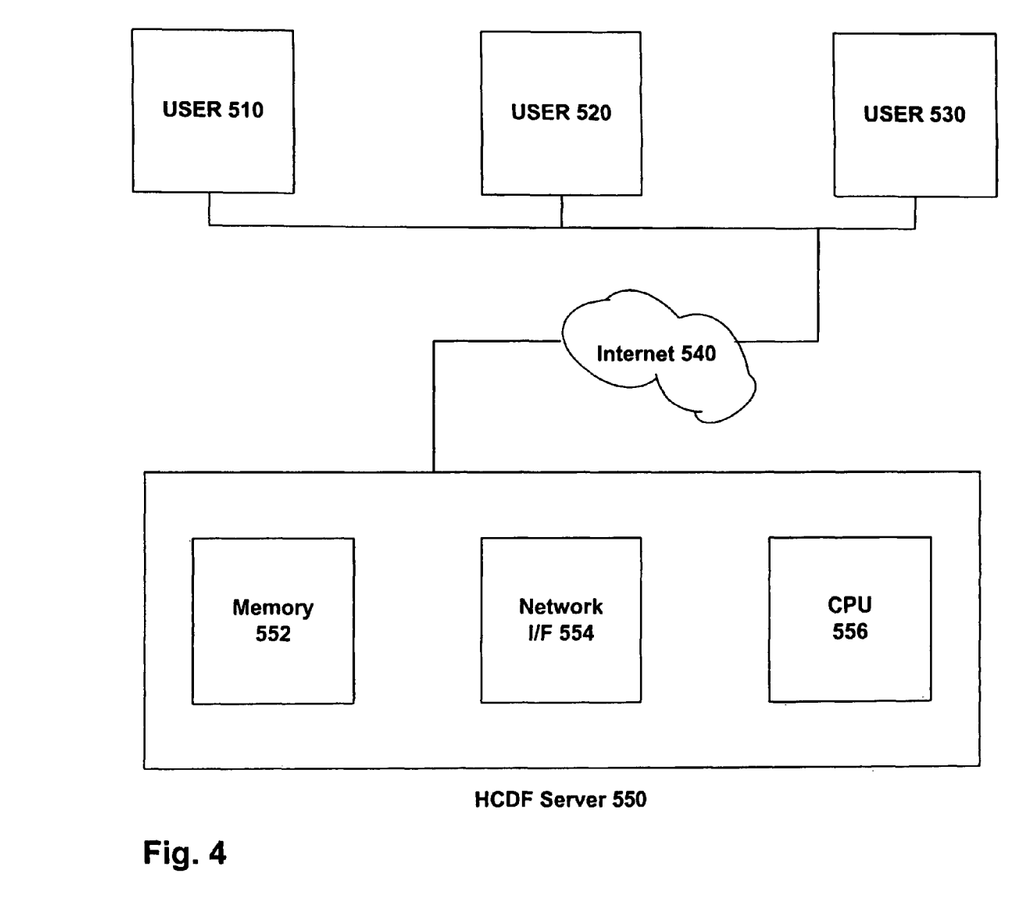
FIG. 4 shows a block diagram of a system in accordance with an embodiment of the invention.

The processes described above may be carried out by a computer data processing system. FIG. 4 shows a block diagram of a system for implementing the processes described above in accordance with an embodiment of the invention. FIG. 4 shows user interfaces 510, 520, and 530. User interfaces 510, 520, and 530 allow users to receive and send information between a human capital development framework server 550. The users may include employees, business unit HR directors, corporate staff and/or business unit leaders. The user interfaces 510, 520, and 530 are coupled to the human capital development framework server 550 by any known network connection and may be accessible by the World Wide Web (WWW) 540. The human capital development framework 550 includes a memory 552, a network interface 554 and a CPU 556. In operation, the surveys described in connection with tiers one through 4 above, may be delivered to the user interfaces 510, 520, and 530. Users can complete the surveys and have them sent to the human capital development framework server 550 via the network interface 554 to the memory 552. The survey results can then be processed by the CPU 556 in an iterative manner so as to arrive at a final report.

Figure 5:
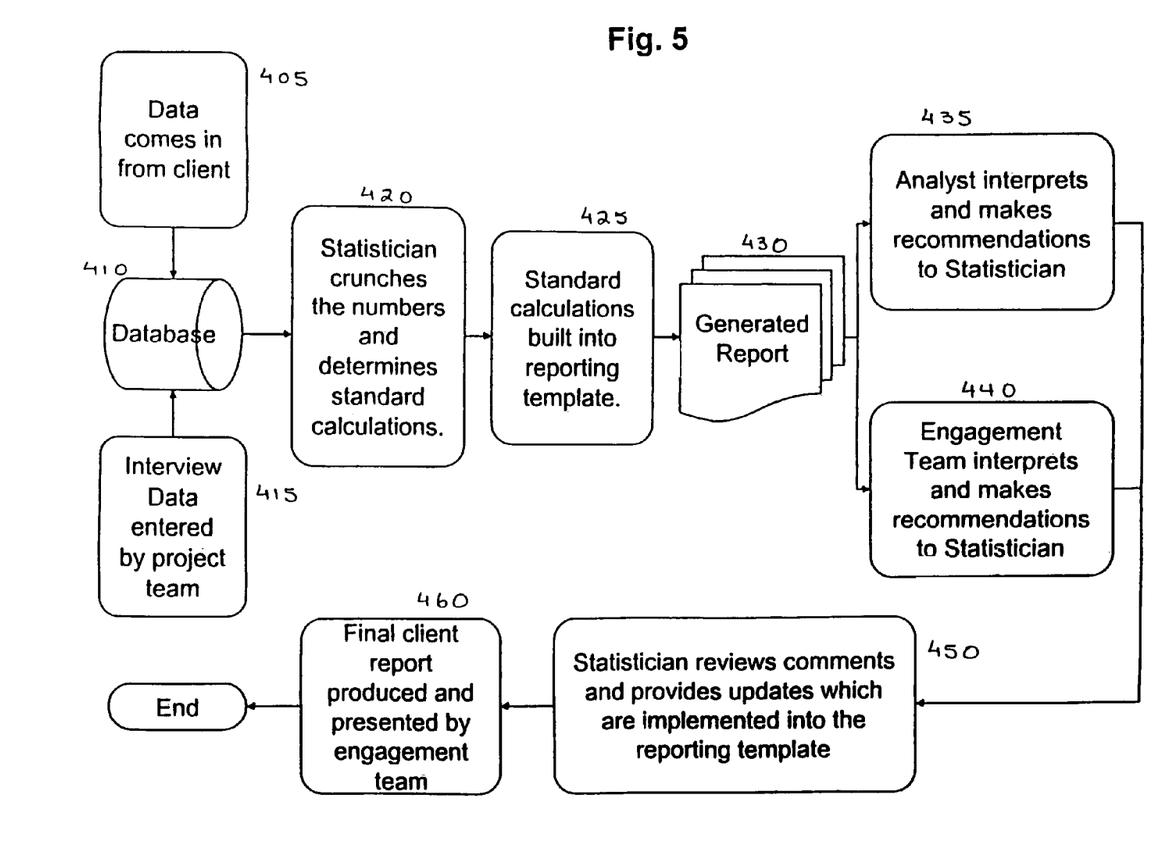
FIG. 5 illustrates a process for utilizing the human capital development framework in accordance with an embodiment of the invention.

FIG. 5 illustrates a process in accordance with an embodiment of the invention by which the scores for each element in the model and the affect of human capital development resources on an organization's financial well-being is determined. In FIG. 5, the process begins with step 405 where a client provides data received from employees, human resources managers, or business leaders. The received data is stored in a database 410. The data may be gathered from surveys eliciting information and the surveys may be based upon any of the elements shown in FIG. 1. In addition, in step 415, interview data and data from public sources is also sent for storage into the database 410. The interview data includes data that may be gathered by managers interviewing particular employees. The data from both the client surveys and the interviews is stored in the database 410 and the process then moves to step 420.

In step 420, the received data is processed and scored. In addition, the scores for each element are determined in this step, as are the statistical relationships between tiers. The process then moves to step 425. In step 425, standard calculations are built into a reporting template. The process then moves to step 430. In step 430, a report is generated and the process then moves to steps 435 and 440.

In step 435, an analyst interprets the report and makes recommendations to the statistician, and in step 440, an engagement team interprets the report and makes recommendations to the statistician. Following steps 435 and 440, the process moves to step 450. In step 450, a statistician reviews the comments and provides updates which are reported into the reporting template. The process then moves to step 460 where a final report is produced and is presented by the engagement team. The process for collecting data and reporting results for a particular client then ends. Cross-company analysis, however, will take place on a continuous basis as more clients add data to the database.

While the present invention has been particularly shown and described with reference to a preferred embodiment thereof, it will be understood by those skilled in the art that various other changes in the form and details may be made without departing from the spirit and scope of the invention.

The invention claimed is:

1. A computer-readable recording medium storing a computer-executable program which, when executed by a processor, performs a method for determining how one or more human capital practices of an organization create an impact on business results of the organization, the method comprising:
   a. generating a human capital process tier, a human capital capabilities tier having a set of human capital capabilities evaluation elements, a key performance drivers tier, and a business results tier; said
      i. human capital process tier comprising: a set of human capital process evaluation elements for analyzing an approach of the organization to a human capital process; a set of survey questions regarding each of the human capital process evaluation elements; a maturity score determination algorithm containing instructions for causing the computer executing the algorithm to combine and weigh data from the survey questions to determine a maturity score of each of the human capital process evaluation elements; and a capital process algorithm containing instructions for causing the computer executing the algorithm to statistically link a maturity score for each of the human capital process evaluation elements of the capital process tier to human capital capabilities evaluation elements of the human capital capabilities tier using a regression analysis;
      ii. human capital capabilities tier comprising: a set of human capital capabilities evaluation elements for evaluating employee attitudes and abilities; a set of survey questions regarding each of the human capital evaluation elements; a capital capabilities score determination algorithm containing instructions for causing the computer executing the algorithm to compile and determine a score that assesses strengths and weaknesses of each of the human capital capabilities evaluation elements; and a capital capabilities algorithm containing instructions for causing the computer executing the algorithm to statistically link the score of each of the human capital capabilities evaluation elements to key performance drivers elements of the key performance tier using a regression analysis;
      iii. key performance drivers tier comprising: a set of key performance drivers elements for evaluating non-financial intermediate organization outcomes; a set of survey questions regarding each of the key performance drivers elements; a key performance drivers score determination algorithm containing instructions for causing the computer executing the algorithm to compile and determine a score that assesses strengths and weaknesses of each of the key performance drivers elements; and a key performance drivers algorithm containing instructions causing the computer executing the algorithm to statistically link the score of each of the key performance driving elements to business results elements of the business results tier using a regression analysis; and
      iv. business results tier comprising: a set of business results elements for measuring business results; a set of survey questions regarding each of the business results elements; a business results score determination algorithm containing instructions for causing the computer executing the algorithm to compile and determine a score that assesses strengths and weaknesses of each of the business results elements;
   b. generating a score set by performing statistical analysis on each of the elements of the human capital process tier, human capital capabilities tier, key performance drivers tier, and business results tier;
   c. generating a scorecard for illustrating the impact of the one or more human capital practices by processing the score set; and
   d. using the scorecard for assessing how the organization's human capital practices impact its business results.

2. The computer-readable recording medium of claim 1 wherein the step of generating a scorecard comprises the steps of:
   developing a set of numeric and graphic terms suitable for benchmarking; and
   generating a fact-based foundation for marking recommendations for development and management of personnel for improving business results.

3. The computer-readable recording medium of claim 2, wherein the step of generating a scorecard comprises the steps of:
   processing the set of numeric and graphic terms, and
   processing the fact-based foundation to generate a scorecard for illustrating the impact of the human capital process.

4. The computer-readable recording medium of claim 1 wherein the set of human capital process evaluation elements comprises one or more elements selected from a group consisting of:
   a competency management element, a career development element, a performance appraisal element, a succession planning element, a recruiting element, a workforce planning element, a workforce design element, a rewards and recognition element, an employee relations element, a human capital strategy element, a learning management element, a knowledge management element, and a human capital infrastructure element.

5. The computer-readable recording medium of claim 1 wherein the set of questions on the human capital process elements comprises one or more questions selected from a group consisting of questions on:
   best practice activities supported by the process; technology supporting the process, skills and abilities necessary for people to effectively carryout the process; organizational commitment to the process; improvement of the process; or the process's effectiveness in supporting employees.

6. The computer-readable recording medium of claim 1 wherein the set of human capital capabilities evaluation elements comprises one or more elements selected from a group consisting of:
   a leadership element, a workforce proficiency element, a workforce adaptability element, and a human capital efficiency element.

7. The computer-readable recording medium of claim 1 wherein the set of key performance drivers elements comprises one or more elements selected from a group consisting of:
   a productivity element, a quality element, an innovation element, and a customers element.

8. The computer-readable recording medium of claim 1 wherein the set of business results elements comprises one or more elements selected from a group consisting of:
a revenue growth element, a market share element, and a stock performance element.

9. The computer-readable recording medium of claim 1 wherein the impact of the human capital practice comprises organizational strengths in various elements, areas for improvement, and an assessment of process maturity in human capital capabilities.

10. A computer-implemented method for determining how an organization's human capital practices impact its business results; the computer including a processor and memory and the method comprising steps performed by the computer of:
 a. generating, by the processor, a human capital process tier, a human capital capabilities tier having a set of human capital capabilities evaluation elements, a key performance drivers tier, and a business results tier; said
  i. human capital process tier comprising: a set of human capital process evaluation elements for analyzing an approach of the organization to a human capital process; a set of survey questions regarding each of the human capital process evaluation elements; a maturity score determination algorithm containing instructions for causing the computer executing the algorithm to combine and weigh data from the survey questions to determine a maturity score of each of the human capital process evaluation elements; and a capital process algorithm containing instructions for causing the computer executing the algorithm to statistically link a maturity score for each of the human capital process evaluation elements of the capital process tier to human capital capabilities evaluation elements of the human capital capabilities tier using a regression analysis;
  ii. human capital capabilities tier comprising: a set of human capital capabilities evaluation elements for evaluating employee attitudes and abilities; a set of survey questions regarding each of the human capital evaluation elements; a capital capabilities score determination algorithm containing instructions for causing the computer executing the algorithm to compile and determine a score that assesses strengths and weaknesses of each of the human capital capabilities evaluation elements; and a capital capabilities algorithm containing instructions for causing the computer executing the algorithm to statistically link the score of each of the human capital capabilities evaluation elements to key performance drivers elements of the key performance tier using a regression analysis;
  iii. key performance drivers tier comprising: a set of key performance drivers elements for evaluating non-financial intermediate organization outcomes; a set of survey questions regarding each of the key performance drivers elements; a key performance drivers score determination algorithm containing instructions for causing the computer executing the algorithm to compile and determine a score that assesses strengths and weaknesses of each of the key performance drivers elements; and a key performance drivers algorithm containing instructions causing the computer executing the algorithm to statistically link the score of each of the key performance driving elements to business results elements of the business results tier using a regression analysis; and
  iv. business results tier comprising: a set of business results elements for measuring business results; a set of survey questions regarding each of the business results elements; a business results score determination algorithm containing instructions for causing the computer executing the algorithm to compile and determine a score that assesses strengths and weaknesses of each of the business results elements;
 b. generating, by the processor, a score set by performing statistical analysis on each of the elements of the human capital process tier, human capital capabilities tier, key performance drivers tier, and business results tier;
 c. generating, by the processor, a scorecard for illustrating the impact of the one or more human capital practices by processing the score set; and
 d. using the scorecard for assessing how the organization's human capital practices impact its business results.

11. The method of claim 10 wherein the step of generating a scorecard comprises the steps of:
developing a set of numeric and graphic terms suitable for benchmarking; and
generating a fact-based foundation for marking recommendations for development and management of personnel for improving business results.

12. The method of claim 11, wherein the step of generating a scorecard comprises the steps of:
processing the set of numeric and graphic terms, and
processing the fact-based foundation to generate a scorecard for illustrating the impact of the human capital process.

13. The method of claim 10 wherein the set of human capital process evaluation elements comprises one or more elements selected from a group consisting of:
a competency management element, a career development element, a performance appraisal element, a succession planning element, a recruiting element, a workforce planning element, a workforce design element, a rewards and recognition element, an employee relations element, a human capital strategy element, a learning management element, a knowledge management element, and a human capital infrastructure element.

14. The method of claim 10 wherein the set of questions on the human capital process elements comprises one or more questions selected from a group consisting of questions on:
best practice activities supported by the process; technology supporting the process, skills and abilities necessary for people to effectively carryout the process; organizational commitment to the process; improvement of the process; or the process's effectiveness in supporting employees.

15. The method of claim 10 wherein the set of human capital capabilities evaluation elements comprises one or more elements selected from a group consisting of:
a leadership element, a workforce proficiency element, a workforce adaptability element, and a human capital efficiency element.

16. The method of claim 10 wherein the set of key performance drivers elements comprises one or more elements selected from a group consisting of:
a productivity element, a quality element, an innovation element, and a customers element.

17. The method of claim 10 wherein the set of business results elements comprises one or more elements selected from a group consisting of:
a revenue growth element, a market share element, and a stock performance element.

18. The method of claim 10 wherein the impact of the human capital practice comprises organizational strengths in various elements, areas for improvement, and an assessment of process maturity in human capital capabilities.

* * * * *

UNITED STATES PATENT AND TRADEMARK OFFICE
CERTIFICATE OF CORRECTION

PATENT NO. : 8,095,415 B1  
APPLICATION NO. : 10/430674  
DATED : January 10, 2012  
INVENTOR(S) : Robert J. Thomas et al.

Page 1 of 1

It is certified that error appears in the above-identified patent and that said Letters Patent is hereby corrected as shown below:

On the Title Page, Item (73), Assignee: "Accenture Global Services GmbH, Schaffhausen (CH)" should read --Accenture Global Services Limited, Dublin 4, IRELAND"--.

On the Title Page, Item (74), in the "*Attorney, Agent, or Firm*", line 2, "LLC" should read --LLP--.

In claim 5, column 10, line 51, "to effectively carry out" should read --to effectively carry out--.

In claim 14, column 12, line 42, "to effectively carryout" should read --to effectively carry out--.

Signed and Sealed this  
Eighteenth Day of September, 2012

David J. Kappos  
*Director of the United States Patent and Trademark Office*